United States Patent [19]

Schneider, Jr.

[11] 4,331,848
[45] May 25, 1982

[54] INERTIA ACTIVATED ELECTRICAL POWER SOURCE

[75] Inventor: Clayton J. Schneider, Jr., East Aurora, N.Y.

[73] Assignee: Calspan Corporation, Buffalo, N.Y.

[21] Appl. No.: 196,992

[22] Filed: Oct. 14, 1980

[51] Int. Cl.³ .............................................. H01H 35/14
[52] U.S. Cl. ............................. 200/61.45 R; 200/61.5; 340/669
[58] Field of Search ...................... 200/61.45 R, 61.48, 200/61.5, 61.52, 277, 300, DIG. 22; 340/669, 670; 362/72, 802

[56] References Cited

U.S. PATENT DOCUMENTS

| | | | |
|---|---|---|---|
| 2,122,215 | 6/1938 | Saelen | 362/802 X |
| 2,763,773 | 9/1956 | Morente | 200/61.52 X |
| 2,943,418 | 7/1960 | Smith | 200/61.45 R X |
| 3,123,801 | 3/1964 | Bosler | 200/61.52 X |
| 3,154,774 | 10/1964 | Ochs | 200/61.45 R X |
| 3,154,776 | 10/1964 | Otten | 200/61.45 R X |
| 3,681,587 | 8/1972 | Brien | 362/802 X |
| 3,800,133 | 3/1974 | Duval | 362/802 X |
| 4,176,390 | 11/1979 | Galbert | 200/61.45 R X |

Primary Examiner—B. Dobeck
Attorney, Agent, or Firm—Biebel, French & Nauman

[57] ABSTRACT

Disclosed is an inertia activated power source in which the moving element is typically a mercury cell shearing a restraining wire at a predetermined G force. The moving cell is then caught between two spring contacts that extend exterior the case providing electrical terminals. Once activated, a spring latch locks the cell in place between the contacts. The action of the spring contacts materially reduces the shock on the battery when the device is subjected to forces many times greater than the desired activation source for the power source.

6 Claims, 3 Drawing Figures

INERTIA ACTIVATED ELECTRICAL POWER SOURCE

BACKGROUND OF THE INVENTION

The field of the invention is in the art of accelerometers and more particularly that of inertia switching devices.

It is frequently desirable to "turn on" ("enable" and "activate" also are synonymous, frequently uses terms) and electrical circuit when a relatively sudden and abrupt change of velocity occurs, i.e., an acceleration greater than a predetermined amount. The term "acceleration" is presumed to include both the positive and negative. Thus, de-acceleration is negative acceleration with the velocity vector still in the same direction. Inertia is that tendency of a body to resist acceleration. The inertia-activated electric power source of this invention provides a voltage on a pair of external terminals on the happening of a predetermined magnitude of acceleration. Generally, inertia-activated devices are well known. The use of an inertia device to activate restraining air bags that inflate on the collision of an automobile is a typical well-known example. The term "set back-actuated" is frequently applied to devices sensing forward thrust or positive acceleration, while "impact-actuated" is frequently applied to similar devices sensing sudden slowing or stopping, i.e., de-acceleration or negative acceleration. Typical examples of the former are devices for sensing the launching of airplanes, missiles, and projectiles, while typical examples of the latter are collision-sensing devices, excessive package handling load sensing devices, and safety beacon actuated devices.

Generally, inertia devices are rated as to the number of G's required to activate them, G being the acceleration of gravity under standard conditions on the surface of the earth. Generally, inertia devices may be used for either positive G forces or negative G forces by merely turning them around. In some instances, it may be desirable to take into consideration a slight change in calibration due to a change in static load.

An inertia-activated device must generally be very rugged and reliable. Quite frequently, they must withstand and continue to function after experiencing shock forces many times greater than that at which they initially operate. Many prior art devices are quite complex and their reliability to withstand shocks of greater magnitude than they were designed to sense is relatively low. Generally, prior art inertia-activated power sources are merely inertia switches connected by wiring to a battery with each requiring shock protection. It is thus an object of the present invention to provide an inertia-activated electrical power source in which a battery, in addition to supplying the electrical power is also the actuating element in sensing the acceleration.

It is another object of the invention to provide an extremely rugged, relable inertia-activated power source that may readily be adjusted for various G load activating forces.

It is another object of the invention to provide an inertia-activated electrical power source that upon activation latches in the "on" position.

It is another object of the invention to provide a positive action device that is either "off" or "on" without any chattering, or partial or intermittent contacting of the internal electrical circuits of the device.

It is another object of the invention to provide an inertia device in which the moving element may readily be cushioned to arrest its motion toward the end of its travel thus preventing any undue shock damage.

It is yet another object of the invention to provide an inertia-activated electrical power source that has extremely few parts, is simple and economical to manufacture.

SUMMARY OF THE INVENTION

The invention provides a rugged, reliable, self-contained inertia-activated power source that is readily adjusted for predetermined actuating G forces. The device is low in electrical "noise", with no indefinite stage of operation, and once actuated, the device locks in the actuated ("on") position.

DESCRIPTION OF A PREFERRED EMBODIMENT

Figure 1:
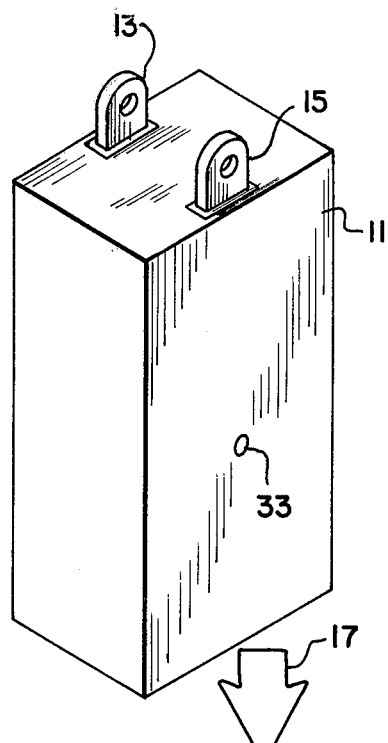
FIG. 1 is a pictorial-schematic view of an embodiment of the invention.

FIG. 1 illustrates pictorially a typical embodiment of the invention. The case 11 of the device is conventionally attached to the structure which will undergo the acceleration. No voltage is present on terminals 13 and 15 until the case 11 (and the structure to which it is attached) experiences an acceleration 17 of a predetermined magnitude. At the predetermined magnitude of acceleration, an output voltage providing electrical power becomes present between terminals 13 and 15. This voltage and electrical power remains after the acceleration causing its activation increases, decreases, or ceases. The internal structure of the device provides shock protection for acceleration or de-acceleration forces many times greater than that required to actuate the device.

Figure 2:
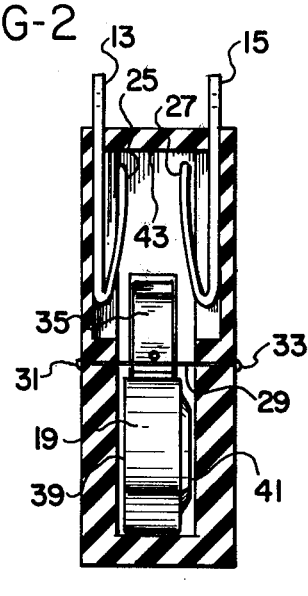
FIG. 2 is a side section of the embodiment illustrated in FIG. 1.
Figure 3:
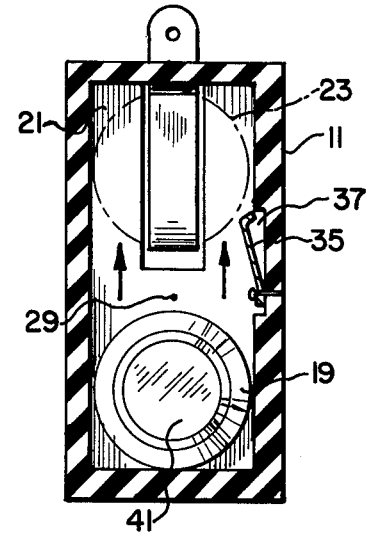
FIG. 3 is a front section of the embodiment illustrated in FIG. 1.

Referring further to FIGS. 2 and 3 of the drawing, the inertia-activated electrical power source 11 has a self-contained battery 19, such as a conventional silver, mercury, alkaline, or similar cell, that also functions as a moving element of an inertia sensor. The cell, or battery, as it is commonly called, is contained in the elongated cavity 21 of case 11. The material from which the case is fabricated is not critical. It should be rugged and not short circuit the battery. High impact phenolic material such as used in printed circuit board material is generally suitable. A suitable embodiment of the invention may be fabricated from one side copper clad insulating board with a copper coating on the exterior of the case. A case may readily be fabricated by soldering and it may also be attached to other structures by soldering. The copper cladding must be removed in the areas adjacent the terminals to prevent a short circuit of the output voltage.

Under sufficient downward (in the illustration) acceleration, the battery, due to its inertia, will slide from its original position 19 in the lower end of the cavity to a position 23 in the upper end of the cavity. In doing so, it wedges between the spring contacts 25 and 27 and the battery voltage is provided at terminals 13 and 15. However, before the battery can move appreciably, it must shear the shear member 29. A small copper wire is a suitable shear member. The shear wire is conventionally soldered at its ends 31 and 33 to the copper surface of the board. Knowing the shearing constant of the material of the wire, the mass of the battery, and the desired activating G force, the diameter of the wire may readily be calculated. However, as is common with many such similar devices, the calculated value is substantially a first approximation figure and exact values will later be determined depending on manufacturing tolerances employed and other variables. It is to be observed that the contact of the battery with the wire is not an ideal shear relationship, and that tension is also present due to necessary side clearances between the battery and the case. The magnitude of acceleration required to activate the device may readily be adjusted by merely changing the size of the shear wire to suit the desired application.

Spring latch 35 readily compresses into recess 37 as the battery moves from the lower to the upper position allowing the battery to pass. After the battery has passed the latch, the latch moves back out and prohibits the battery from moving away from the contacts once contact has been established.

Inertia-activated power sources such as being disclosed frequently are designed to function at for example a 10 G force but must continue to function even though the acceleration forces proceeds to several hundred G's. A novel feature of the invention is that the battery which provides electrical power in its function of providing a moving inertia element also is undergoing self-protection from excessive shock that might otherwise damage the battery or at least require additional components to physically protect the battery from damage. This shock protection is accomplished first through the restraining action experienced with the battery in shearing the wire 29 and second by the additional restraining action provided by the wedging effect created as the electrical contact areas 39 and 41 of the battery engage and slide into the spring contacts 25 and 27. While the latching spring 25 does contribute to the arresting of the movement of the battery, it is generally comparatively negligible. If further cushioning of the battery is necessary, energy absorbing material such as rubber may be cemented to the surface 43 at the upper end of the cavity.

While the principles of the invention in connection with specific apparatus have been described, it is to be understood that the foregoing description is by way of example only and not as a limitation to the scope of the invention as set forth in the accompanying claims.

What is claimed is:

1. An inertia-activated electrical power source comprising:
   a. a battery having a first electrical contact and a second electrical contact;
   b. a case having an elongated cavity with a first end for containing the said battery in a first position and a second end for containing the said battery in a second position, the battery being movable in the said cavity from the said first position to the said second position;
   c. a first electrical contact and a second electrical contact positioned in the said second end of the said cavity for making electrical contact to the said battery first and second electrical contacts respectively when the battery is in the said second position;
   d. means for providing a first and a second electrical connection exterior the said case, each connected respectively with the said first and second electrical contacts positioned in the second end of the case cavity; and
   e. a shear member retaining the said battery in the said first position until said inertia acting on the said battery causes the said battery to shear the said shear member and the battery to move to the said second position whereby electrical power is provided to said first and second exterior electrical connections.

2. The power source as claimed in claim 1 wherein the said first and second electrical contacts positioned in the said second end of the cavity are spring contacts engaging the said electrical contacts of the said moveable battery in slideable relationship.

3. The power source as claimed in claim 2 wherein the said battery is substantially cylindrical with the said first and second electrical contacts being substantially parallel flat surfaces on the ends of the cylinder.

4. The power source as claimed in claim 3 wherein a latch is provided within the said case holding the said battery in the said second position.

5. An inertia-activated power source responsive to an acceleration vector of a predetermined magnitude, comprising:
   a. a battery having a predetermined mass and a first electrical contact and a second electrical contact;
   b. a case having an elongated cavity with a first end for containing the said battery in a first position and a second end for containing the said battery in a second position, the battery being moveable in said cavity from the said first position to the said second positon;
   c. the said case positioned relative the said acceleration vector such that the said movement of the the said battery from the said first position to the said second position is in a direction opposite the said acceleration vector;
   d. a first electrical contact and a second electrical contact positioned in the said second end of the said cavity for making electrical contact to said battery first and second electrical contacts respectively when the battery is in the said second position;
   e. means for providing a first and a second electrical connection exterior the case, each connected respectively with the said first and said second electrical contacts positioned in the second end of the case cavity; and
   f. a shear member having a determined breaking force for holding the said battery in the said first position and shearing at the said predetermined magnitude of acceleration whereby the said battery moves to the said second position and electrical power is provided at the said first and second exterior connections.

6. The power source as claimed in claim 5 wherein the said predetermined breaking force of the said shearing member is approximately the said mass of the battery multiplied by the said magnitude of acceleration.

* * * * *